United States Patent [19]
Hissen et al.

[11] Patent Number: 5,739,806
[45] Date of Patent: Apr. 14, 1998

[54] METHOD OF ENTERING AND DISPLAYING THE ADJUSTMENT PARAMETERS OF AN APPARATUS FOR COATING OBJECTS

[75] Inventors: Hans Hissen, Darmstadt; Hans Schumacher, Stuttgart, both of Germany

[73] Assignee: Cegelec AEG Anlagen-und Automatisierungstechnik GmbH, Frankfurt, Germany

[21] Appl. No.: 403,909

[22] PCT Filed: Sep. 17, 1993

[86] PCT No.: PCT/EP93/02525

§ 371 Date: Mar. 21, 1995

§ 102(e) Date: Mar. 21, 1995

[87] PCT Pub. No.: WO94/07191

PCT Pub. Date: Mar. 31, 1994

[30] Foreign Application Priority Data

Sep. 23, 1992 [DE] Germany .................. 42 31 766.5

[51] Int. Cl.$^6$ .................................................. G09B 5/00
[52] U.S. Cl. ........................... 345/115; 345/113; 95/86; 118/323; 118/624; 118/681
[58] Field of Search .................................. 345/113, 115, 345/116, 118, 119, 120, 146; 395/155, 156, 157, 321, 331, 334, 339, 340, 352, 80, 92, 85, 86; 364/188; 901/5, 3; 118/681, 624, 323

[56] References Cited

U.S. PATENT DOCUMENTS

| | | |
|---|---|---|
| 4,831,548 | 5/1989 | Matoba et al. |
| 4,987,527 | 1/1991 | Hamada et al. |

FOREIGN PATENT DOCUMENTS

| | | |
|---|---|---|
| 3014114 | 11/1981 | Germany . |
| 9110348 U | 11/1991 | Germany . |
| 2224370 | 5/1990 | United Kingdom . |
| 89/06181 | 7/1989 | WIPO . |
| 90/00273 | 1/1990 | WIPO . |
| 91/06050 | 5/1991 | WIPO . |

*Primary Examiner*—Dennis-Doon Chow
*Attorney, Agent, or Firm*—Spencer & Frank

[57] ABSTRACT

A process for introducing or displaying the adjustment parameters of a device for coating objects, particularly vehicles and vehicle bodies. The parameters are introduced on or off-line by a personal computer and displayed on the monitor graphically and alphanumerically in a manner which provides a survey of a series of parameters in mutual relationship.

11 Claims, 12 Drawing Sheets

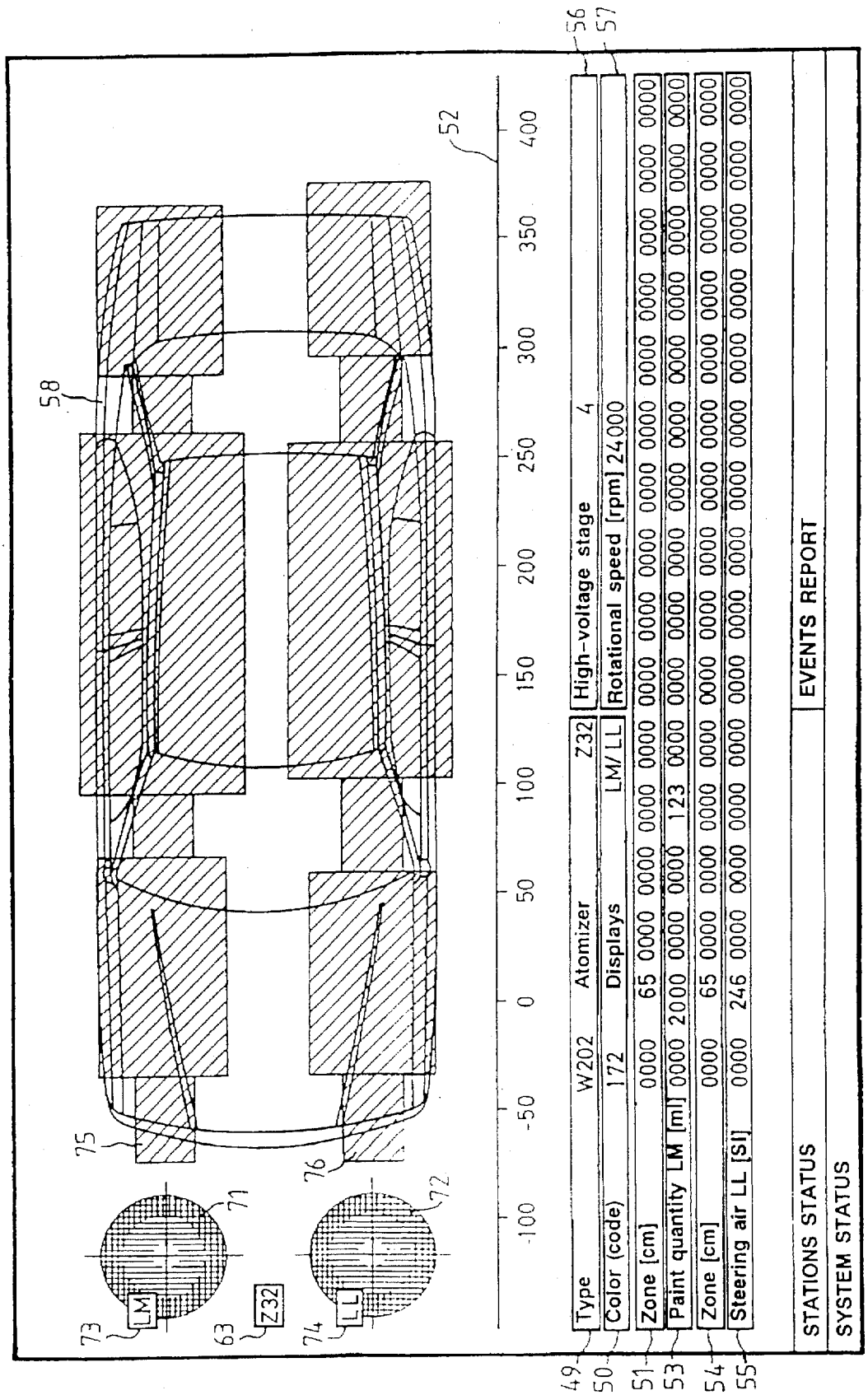

METHOD OF ENTERING AND DISPLAYING THE ADJUSTMENT PARAMETERS OF AN APPARATUS FOR COATING OBJECTS

BACKGROUND OF THE INVENTION

The invention is related to a method of entering and displaying the adjustment parameters of an apparatus for coating objects, particularly vehicles or vehicle parts that are moved into coating positions by a transport apparatus, with at least one spraying or atomizing tool being disposed in a coating station so as to be stationary or to move relative to the objects, and having control elements which are controlled according to the adjustment parameters.

Apparatuses for automatic coating of objects, such as vehicle bodies, with spraying tools are already known which are connected to a program-control apparatus. The program-control apparatus sets the parameters of the spraying apparatus corresponding to the work steps. The objects are guided through coating positions with a transport apparatus (DE 30 14 114).

For coating of, for example, vehicle bodies, painting paths through are used through which the bodies are moved with a transport mechanism. The painting paths are divided into at least three path segments, namely the segment for color preselection, the segment of type recognition and the actual painting segment. As the body passes through the color preselection segment, the desired color is predetermined via an input keyboard of the program control.

During passage through the color preselection segment, rinsing processes are performed, either automatically or by operating personnel, in a controlled manner. Colors are to be selected for the bodies. Color selection values can also be canceled or corrected within the color preselection segment. Furthermore, repetition of the color selection is possible by means of a corresponding command. In a color change, a rinsing process is performed, by means of which the spraying elements, such as spraying heads or atomizing heads, and the lines are cleaned. Painting is performed as a function of the type. Therefore, the type of the respective body is entered into the program control. In the type-recognition segment, the type of the body passing through is determined with sensors. A corresponding painting program is selected by the program control as a function of the type.

Different atomizing devices or spraying devices that can be stationary or movable are located in the painting segment. Stationary atomizing apparatuses are, for example, disposed staggered in height next to the object. A vertically-movable roof-spraying device can further be provided.

Underlying the invention is the problem of developing a method with which the adjustment parameters of a coating apparatus for objects can be monitored with respect to coating objects, and entered as comprehensively as possible for the respective coating process, and represented.

SUMMARY OF THE INVENTION

According to the invention, the problem is solved in that, on the monitor of a personal computer which either stores parametrization data generated by an input apparatus for the coating apparatus offline or further conducts them online to a program control connected to the coating apparatus, the monitor having at least one window, a graphic view of the object and, next to the view of the object and on the correct scale, the coating surface of the at least one spraying tool present on the surface are represented, that coating zones following one after the other in the transport direction of the object are represented schematically by rectangles along a line extending through the center of the represented spraying tool in the view of the object, the length of the rectangles being a measure for the length of the coating zones, and their height being a measure for an adjustment value of the spraying tool, that rows of an input field containing numerical information about the type of displayed object and the identification of the spraying tool that can be called up via the input apparatus for parametrization are displayed below the view of the object, and at least the coating zone lengths are displayed with a further adjustment value that can be parametrized, and that the off- or online operating mode of the program control and a summarizing message about interference are displayed. With this method, the operator can recognize essential setting data of the coating apparatus all at once, not only numerically but also in analog form, with allocation to the object to be coated. While the numerical data exactly reflect the adjustment values, the analog representation displays the relationship to other adjustment values, so that the effects of adjustment values can be detected more clearly and quickly. The operator can create an overall picture of the adjustment values of the coating apparatus using fewer displays, and draw conclusions from them. The method is particularly advantageous in connection with painting segments for vehicles or vehicle parts, such as bodies.

For parametrization, it is advisable when the adjustment values of the respective spraying tools or control elements which are called up for editing and represented alphanumerically or graphically are displayed in a predetermined color on the monitor. This color is, for example, green. Color display of spraying tools and adjustment values also includes those in which the color is in the background, while the numbers and letters are represented, for example, black or light.

Adjustment values of other components of the coating apparatus are also displayed in addition to the components of the coating apparatus that are selected for the editing of the adjustment values. The adjustment values of these other components can only be edited after being correspondingly called up. As long as the components are not called up, the associated adjustment values are displayed alphanumerically and, if need be, graphically in a different color. This color is, for example, blue, and indicates that the adjustment values can be changed, but are not in a state called up for editing.

Finally, components are present in the coating apparatus whose adjustment values are certainly necessary for operating and monitoring the apparatus, but cannot be set or changed via the input apparatus. These adjustment values and the indications of the components are preferably represented in a further color, e.g. yellow, which indicates that the components and their adjustment values cannot be parametrized via the input apparatus.

In a preferred embodiment, a view of the object is represented on the monitor within a rectangle indicating the length and width of the processing, which can be parametrized, the rectangle lying inside a rectangle displaying the necessary working region of the spraying tool; a second rectangle associated with the work region and at a transport-speed-dependent distance from the first rectangle is also represented, via rows of an input field, in which the type of object, the conveying speed, the projection over the object that is necessary for processing, the position of the start cam that initiates the coating process, and the length and width of the respective object are represented.

Information regarding type can take the form of a number or a symbolic name. Likewise, the colors or atomizing apparatuses can be allocated numbers or symbolic names.

Particularly in larger objects, such as automobiles or bodies, because of the design of the spraying apparatus, different sides and different surfaces are coated with different spraying tools that are controlled, for example, numerically. Prior to a spraying or atomizing work cycle, the individual partial surfaces of the object are determined for coating. As a function of the respective vehicle or vehicle type, the partial surfaces are associated with the individual spraying or atomizing tools provided in a system. In addition to surface sections to be coated, the partial surfaces can also have surface sections not to be painted, which are then not coated by the respective spraying or atomizing tool.

Surface names are associated with the partial surfaces. The allocation of the partial surfaces to an object is undertaken according to a table.

The envelope curves of the partial surfaces must be determined corresponding to the dimensions of the object to be coated. It is favorable to perform the parametrization of the envelope curves using a display on the monitor. For this purpose, a view with the contour of the respective object and a selected partial surface for a spraying tool are preferably represented graphically on the monitor having a window, with the type of object, the number of surfaces, the selected spraying tool and the envelope curve coordinates being represented alphanumerically in rows of an input field.

To paint vehicles or vehicle parts, atomizers whose adjustment values are respectively the rotational speed, the applied high voltage, the quantity of paint and the steering air. For parametrization it is useful when fields are provided for parametrization of the quantity of paint for each zone, and of atomizers and the steering air. In a preferred embodiment, therefore, a window that can be represented on the monitor is provided; with this window, a graphic view of the vehicle or vehicle part can be represented along with atomizer symbols and the rectangles associated with the individual zones coated by the respective atomizer, with the height of the rectangles being a measure for the quantity of paint or the steering air, and an alphanumeric input field being provided below the view of the object and the atomizers, with rows related to the vehicle or vehicle part, a selectable atomizer, the high-voltage setting and the rotational speed of the selected atomizer, the zones coated by the atomizers, the color, the quantity of paint and the steering air.

Input fields related to the selection of the atomizers or of technological data for a selected atomizer are respectively provided at the atomizer symbols. With respect to the zones, a technological parameter can be represented simultaneously for several of the atomizers. It is also possible, however, to display a plurality of adjustment parameters for only one atomizer with respect to the zones.

A further window is preferably provided for the entry and display of the spraying strokes alphanumerically in the form of parallel dashes represented on the graphic view of the vehicle or vehicle part, in connection with technological data indicated by rectangles as a function of the zones, which data can be selected for an atomizer, with an input field being provided, with which the switch-on, switch-off points of the strokes and the corresponding switch-on and switch-off positions of the spraying apparatuses can be predetermined numerically.

To coat the sides of the vehicles or vehicle parts, lateral machines are used which, for example, can be controlled in three axes extending perpendicular to one another. Because the lateral contours of the vehicles or vehicle parts have a certain curvature, the atomizers of the lateral machines must be moved along a correspondingly adapted contour. Depending on the shape of the contour and width of the vehicle or vehicle part, a corresponding contour is to be traversed by the spraying tools or atomizers for individual, successive partial surfaces.

For parametrization that can be easily monitored visually, it is advantageous to provide a window on which a top view of the vehicle or vehicle part and, at a distance therefrom, the contour in connection with the respective atomizer are represented, with the type of vehicle or vehicle part, the color, the contour identification, the zones and the axis spacing of the atomizer from a reference line and an identification for a program being given in rows of an input field, the program relating to the path in the respective zone to be traversed by the spraying tool or atomizer.

The invention is described in detail below by way of an embodiment illustrated in a drawing, from which further details, features and advantages ensue.

BRIEF DESCRIPTION OF THE DRAWINGS

FIG. 7a shows an additional window for parametrization of two technological adjustment values for a spraying tool, which window can be represented on a monitor.

DETAILED DESCRIPTION OF THE PREFERRED EMBODIMENTS

Figure 1:
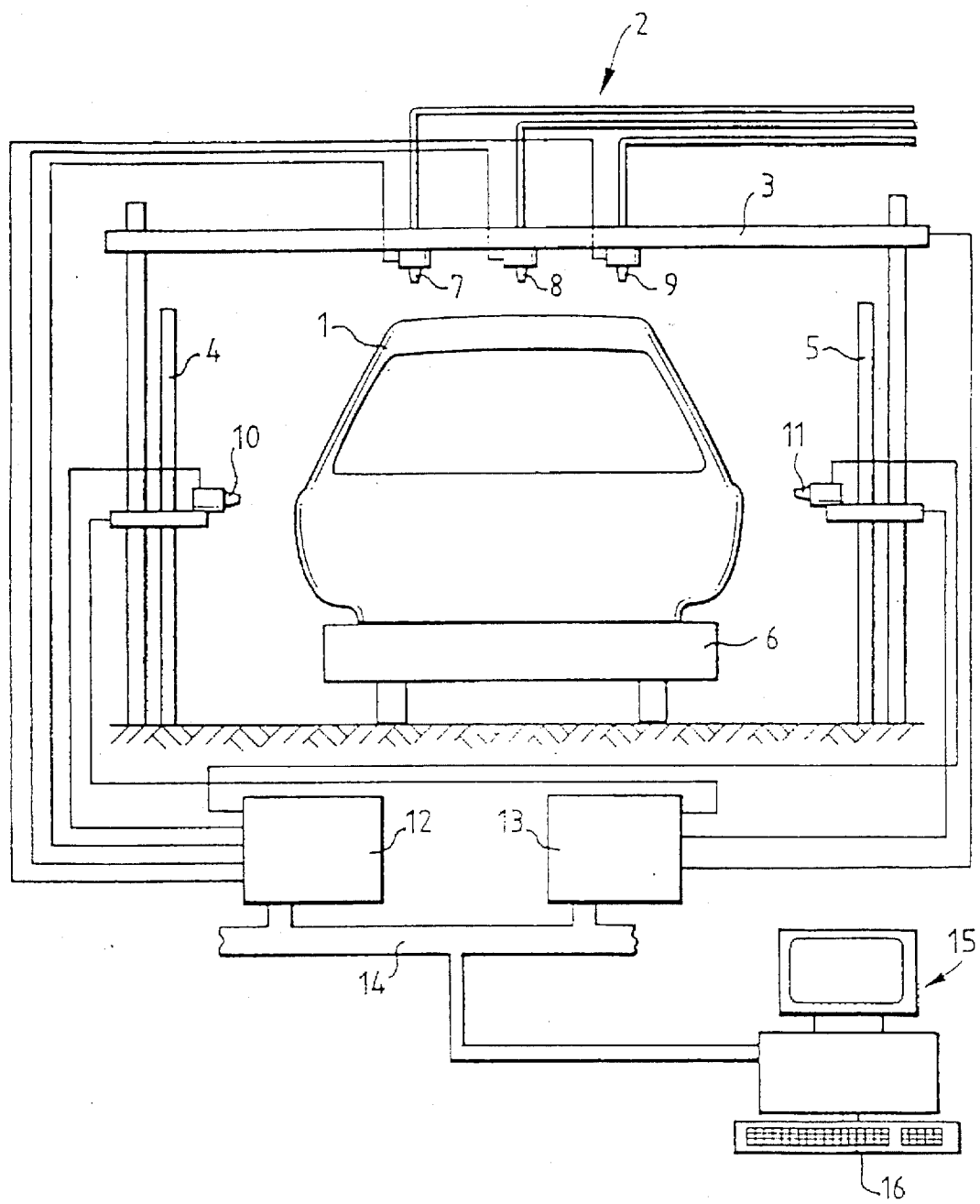
FIG. 1 shows an apparatus for coating motor vehicle bodies, shown schematically from the front.

For coating, particularly painting, of an automobile body 1, generally a plurality of automatic surface painting machines is provided which form a set of automatic machines indicated by 2 in FIG. 1. The set of automatic machines 2 according to FIG. 1 comprises a coating apparatus 3 for the roof of the body 1 and two coating apparatuses 4, 5, one for each side of the body 1. A path control is provided for each coating apparatus. The drives of the coating apparatuses are not shown in detail. The body 1 is transported by a conveyor belt 6. The path controls are synchronized with the conveyor belt 6.

Switch-on and switch-off locations for the paint-spraying elements are determined on the programmable paths. The coating apparatus 3 for the roof of the body 1 includes, as paint-spraying elements, three atomizers 7, 8, 9 disposed adjacently in a row. The coating apparatuses 4, 5 for the sides of the body respectively have atomizers 10, 11. The atomizers 7 through 11 have spraying tubes, not shown in detail, that have bells attached to them. Rotary drives are provided which rotate the spraying tubes. During the rotational movements, coating material and air are supplied to the bells in the correct ratio and correct quantity, controlled by a memory-programmable control 12.

The material flow exiting the bells can be controlled by means of a flow quantity control or regulation, or forced metering. A further memory-programmable control 13 is provided for the movement of the bells along predetermined paths. The two controls 12, 13 are connected to one another and to a personal computer 15 via a bus 14. The control 12 is operative for technological parameters of the coating apparatus, and includes the corresponding processing parameters, e.g. coating parameters and the type of the respective vehicle body to be coated. The drives of the atomizers 7 through 11 and the elements for the conveyance and metering of the coating material are likewise connected to the bus 14.

The personal computer 15 is used, among other things, for parametrizing the automatic surface-painting machines. For this purpose, a window-oriented operating system is provided which can be used online and offline, and includes a keyboard 16, a mouse and/or a touch-screen as an input device.

Programs that are called up by means of a menu are provided for parametrizing the different elements of the automatic surface-painting machines. Among other things, programs are provided especially for parametrizing geometrical data, for parametrizing technological data, and for rinsing the atomizers and their lines during a color change.

Figure 2:
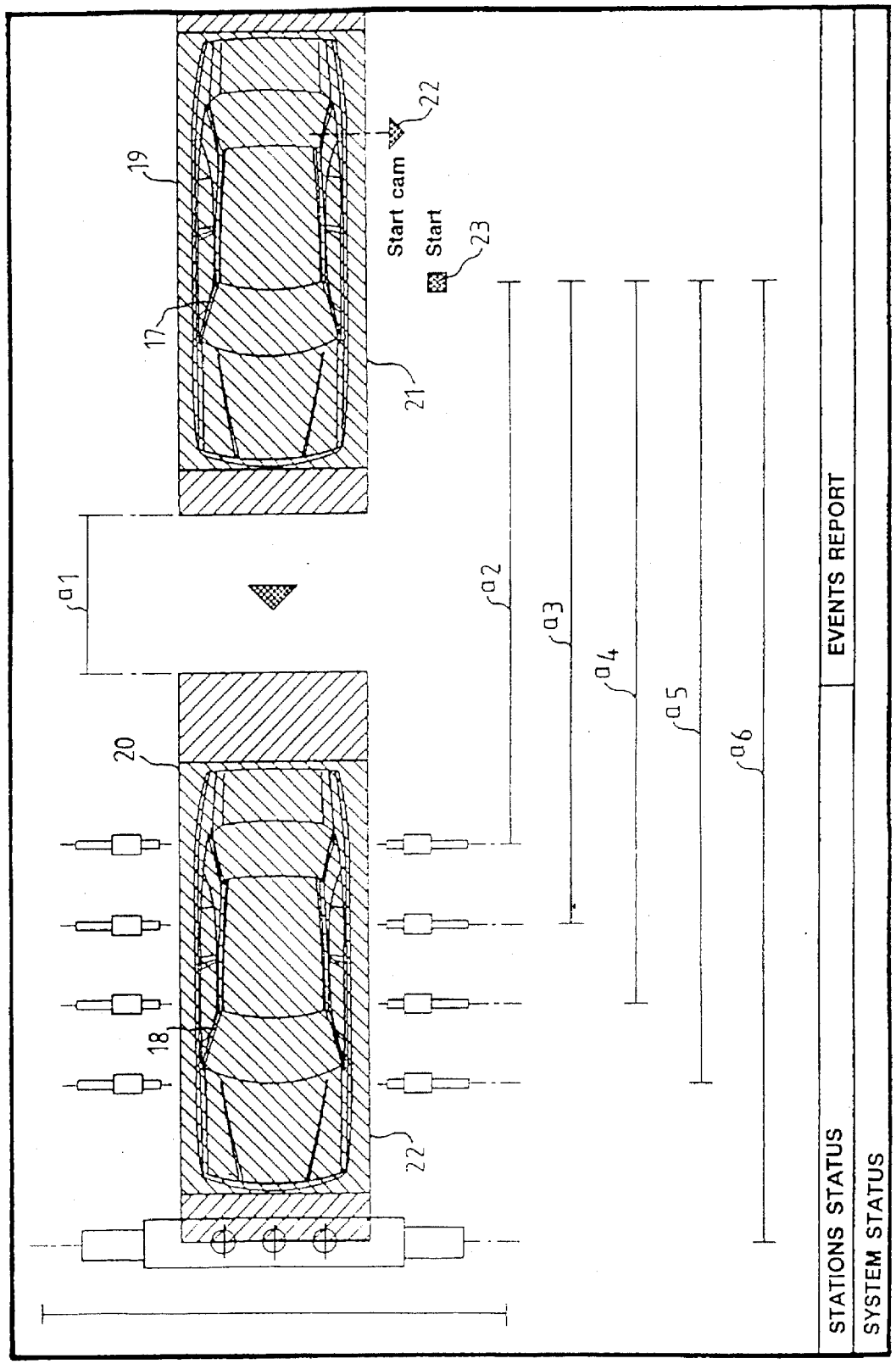
FIG. 2 is a representation of the configuration of a coating apparatus for vehicle bodies, which image can be represented on a monitor.

It is important for parametrization that the configuration of the automatic surface-painting machines be known. Corresponding data about the configuration are stored in registers of the computer 15. The data relate to the transport speed, the transport-dependent painting distance between two working ranges characterized by painting work, and the position of the atomizers in relation to start cams, by which the coating work is triggered when a body passes. The data are represented graphically on the monitor of the computer 15. For this purpose, the representation of the configuration illustrated in FIG. 2 is provided, on which two views of vehicle bodies 17, 18 are represented inside rectangles 19, 20, which respectively indicate a working range associated with a body. The rectangles 19, 20 are again subdivided into the object lengths 21, 22. A distance a1, which is the distance that is established at a certain painting speed, is indicated between the rectangles 19, 20. Furthermore, a start cam is represented by a mark 22. The distances a2, a3, a4, a5 and a6 of four coating apparatuses for the sides, and of the coating apparatus 3 for the roof of the body 1 from the start 23 are likewise represented by lines in the representation of the configuration. A row for alphanumeric indication of the status of the coating apparatus and a global events report is provided beneath the lines.

The representation of the configuration shows the operator which parts of the system specified for parametrization are present.

Figure 3:
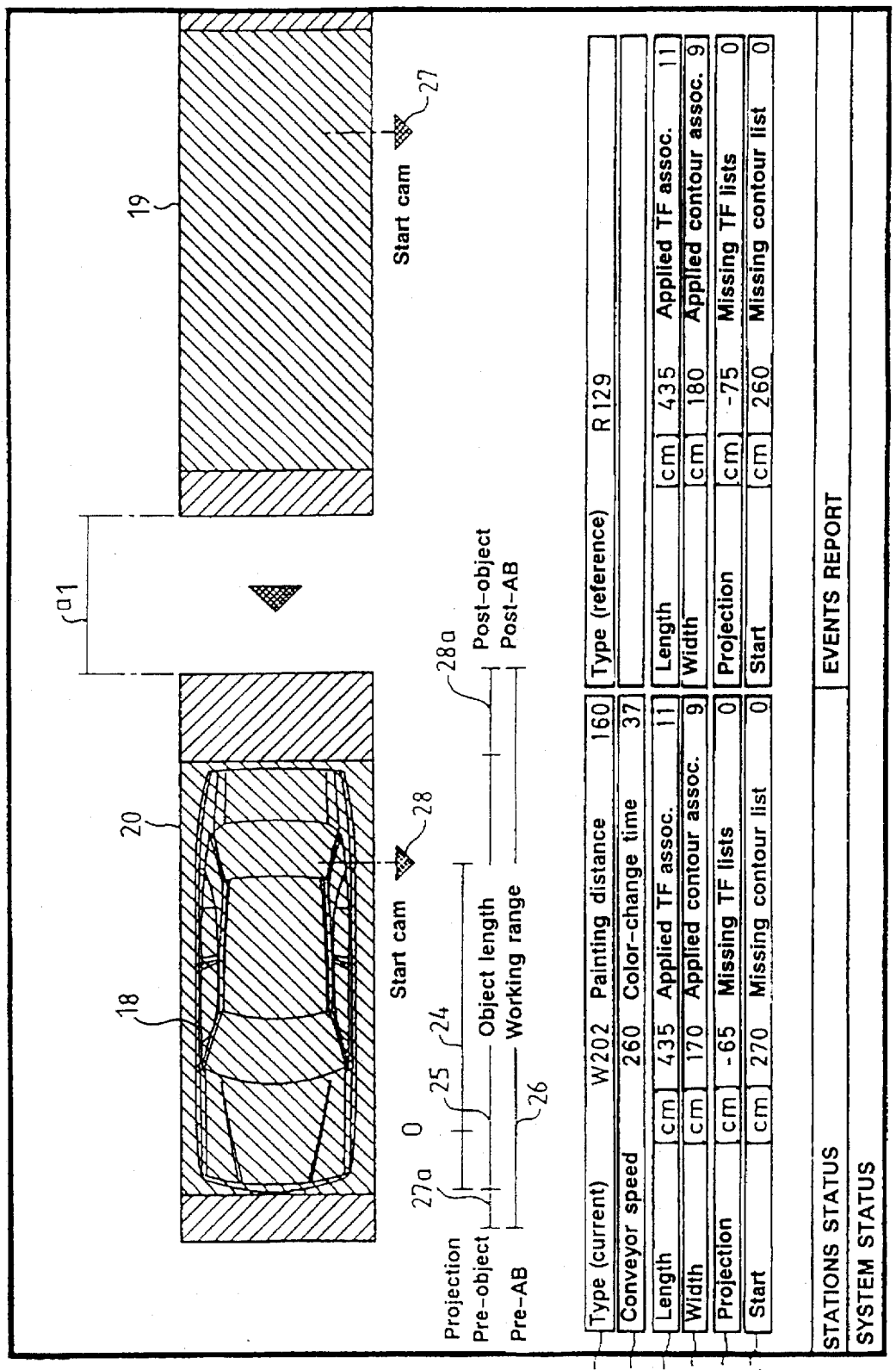
FIG. 3 shows a window for parametrization of geometrical data for the coating apparatus, which window can be represented on a monitor.

Geometrical data for the automatic painting machines are parametrized with the window illustrated in FIG. 3. The dimensions, namely length, width, start and projection, for the respective object, a vehicle body, are predetermined. The rectangles 19 for two working ranges are represented on the monitor, the rectangles being separated from one another by the painting distance al, and the top view 18 of the vehicle body being shown on correct scale in the rectangle 20. Three lines 24, 25, 26 are represented as being parallel to one side of the rectangle 20. The positions of the start cams are likewise represented and indicated by 27, 28 in FIG. 3. The line 26 indicates the entire length of the working range of the set of automated machines 2. The line 25 indicates the object length, which can be parametrized, plus a section 27 before the object, and a section 28 after the object.

The sections 27 and 28 are atomizer-specific, that is, they cannot be freely selected. The line 24 indicates the projection, which is type-specific.

A field having input rows, with which alphanumeric information is displayed, is disposed beneath the line 26. The type of a body and the painting distance are indicated in a first row 29. The conveying speed and the color-change time are displayed in the second row 30. Two rows 31, 32 follow, which respectively indicate the length and width of the object. The values of the projection and the start are indicated in two further rows 33, 34. The type, the painting distance, the length and width can be parametrized. At the same time, the information about type, length, width, projection and start for a reference object can be displayed, at a distance from the information about the selected type for coating, in rows 29, 31, 32, 33, 34. Further rows not indicated in detail are reserved for the station status and global events report.

Surfaces to be painted and surfaces to be left unpainted are associated with the different body types. Each partial surface must be defined, and can comprise a surface to be painted and a surface to be left unpainted.

Figure 4:
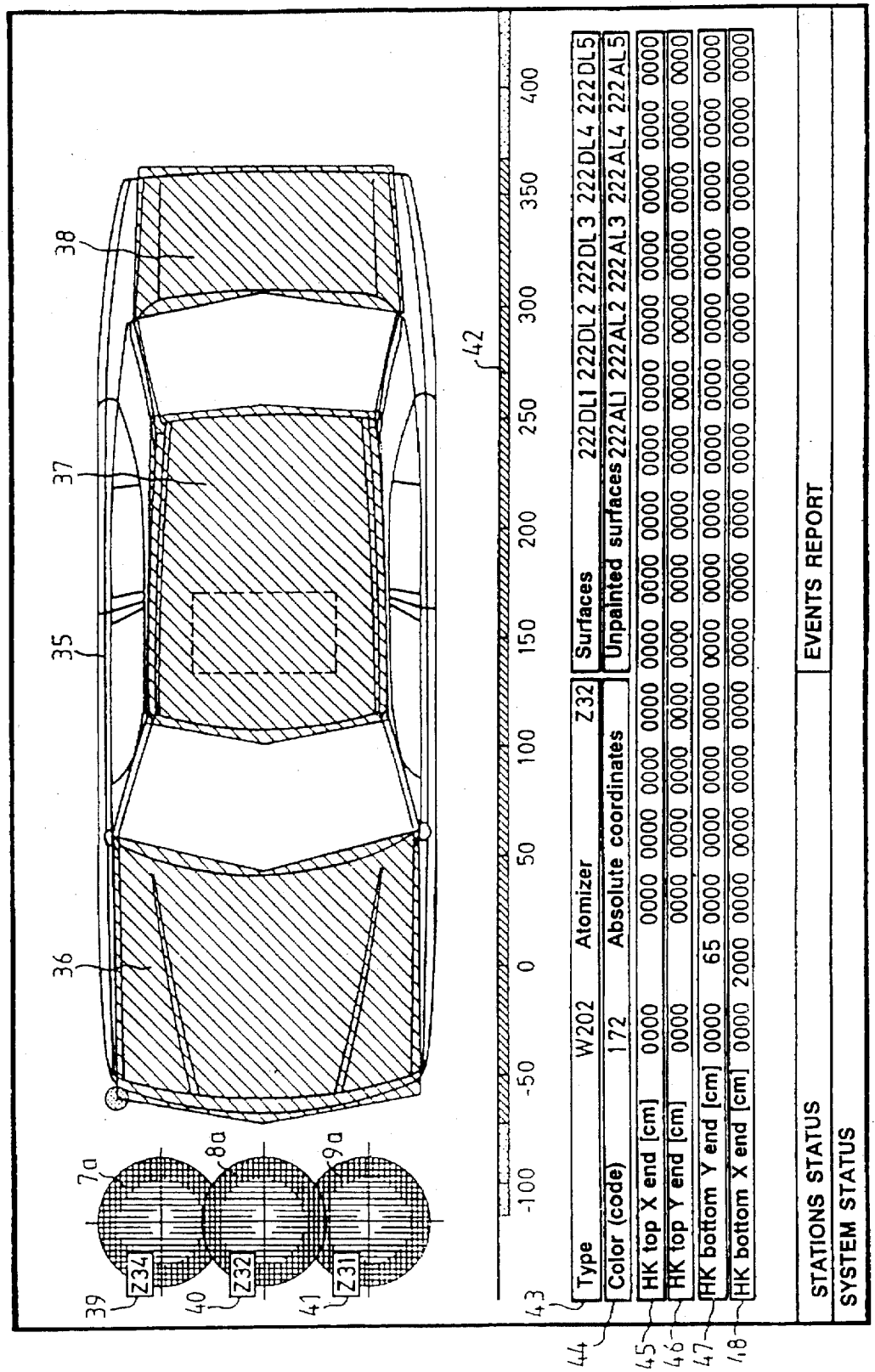
FIG. 4 shows a window for parametrization of partial surfaces processed by individual spraying or atomizing tools on the vehicle bodies, which window can be represented on a monitor.

The allocation of the partial surfaces to a type is effected in tabular form. The envelope curves of the partial surfaces are parametrized, for which purpose a separate window is provided that is illustrated in FIG. 4. The position of the partial surfaces is predetermined by the position of the respective atomizer. With the input of the respective body type and indication of an atomizer, the surfaces to be painted and surfaces to be left unpainted are established for the corresponding view, of which surfaces three are indicated by 36, 37, 38 in FIG. 4, are represented on the monitor in connection with a top view of the body. Moreover, the atomizers 7, 8, 9 are illustrated symbolically with their atomizing cone cross-section 7a, 8a, 9a acting on the object at the level of paths the body passes through. Display fields in the shape of rectangles 39, 40, 41 for indicating atomizers are present at the atomizers. An X-coordinate axis with information about mass related to the body is represented in a row 42. Six rows 43, 44, 45, 46, 47, 48 of an input field are located beneath this row.

The body type and the identification of the selected atomizer are displayed alphanumerically in row 43. Partial surface identifications whose envelope curves can be parametrized are indicated in row 43. A surface selected by way of row 43 is edited by way of rows 45 through 48. The station status and global error message are present in the same way as the above-described windows.

Figure 5:
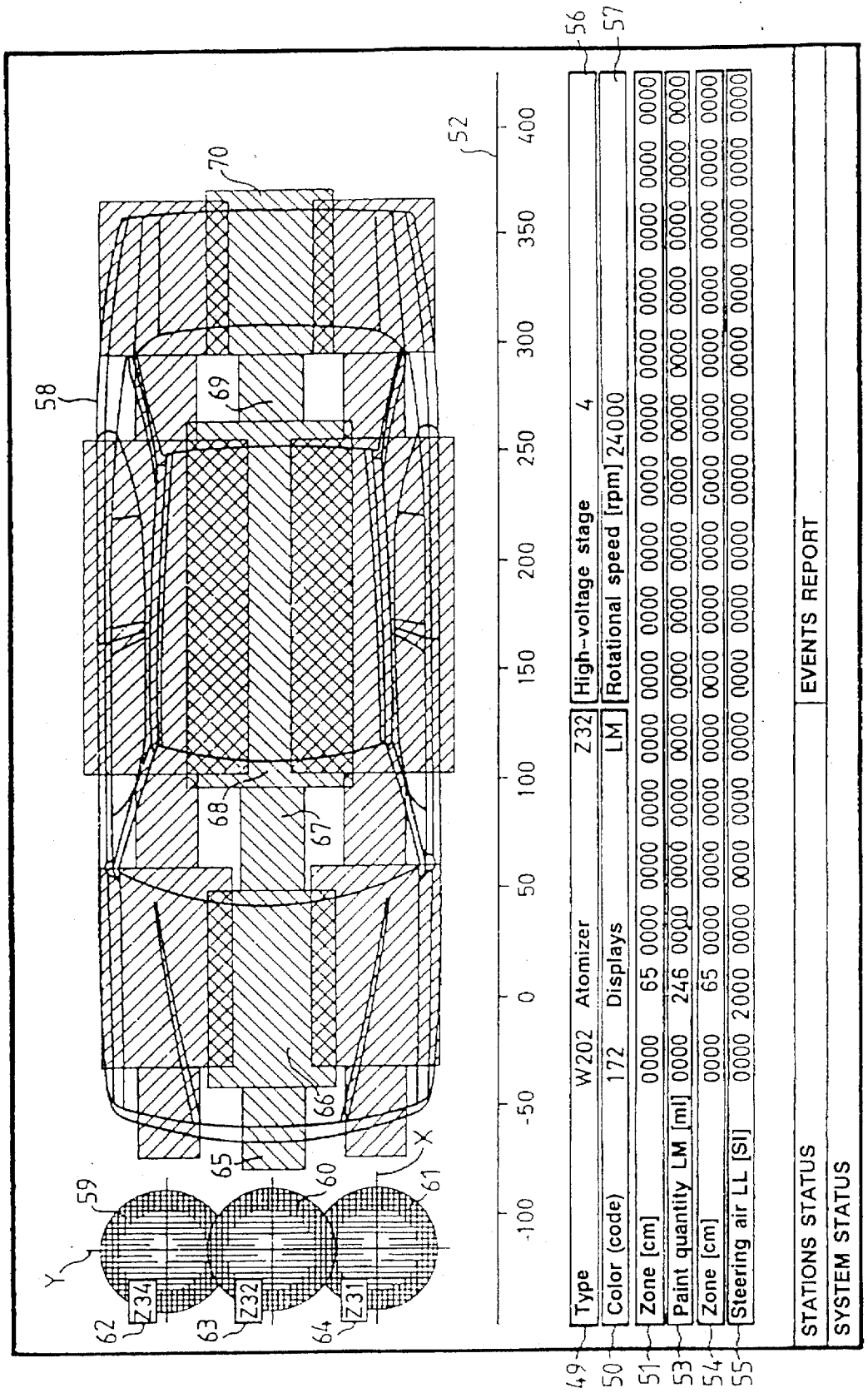
FIG. 5 shows a window for parametrization and display of a technological adjustment value of a first series of coating tools, which window can be represented on a monitor.

The window illustrated in FIG. 5 is provided for parametrization and monitoring of technological data.

Paint quantities, air quantities and zones for which different paint quantities and air quantities are predetermined for the respective atomizers in the transport direction of the body are parametrized by means of the window illustrated in FIG. 5. Parametrization depends on the body type, the color and the atomizer. Therefore, an input field is provided that contains a row 49, with which the corresponding type is entered and displayed in the manner described above. An input and display of the identifying number of an atomizer, which is indicated by Z32 in FIG. 5, is provided in the same row 49. FIG. 1 shows the atomizer of the roof machine indicated by 8. The row 50 located beneath it is specified for the input and display of the code of a paint indicated by "172" in FIG. 5. An input and display for the selection of the respective adjustment value to be edited is provided in the same row 50. According to FIG. 5, the paint quantity for the atomizer Z32 should be edited, which is why the abbreviation "LM" for paint quantity appears.

The paint quantity for the atomizer Z32 is predetermined as a function of the zone. Thus, the individual, successive zones can be entered and represented alphanumerically in a row 51 beneath the row 50. The numerical values for the zones relate to the coordinate values of a cartesian coordinate system represented in a line 52. The line 52 is displayed above the input field. A row 53 for the numerical input and display of the paint quantity for each zone is provided beneath the row 51. A row 54 for the numerical input and display of the zones and which is associated with the steering air is located beneath the row 53. The next row, 55, is specified for the input and display of numerical adjustment values for the steering air. The rows 49, 50 continue respectively in rows 56, 57, separated from one another by a vertical strip, these latter rows being provided for the display of a high-voltage adjustment for the atomizer Z32 and its rotational speed.

A view 58 of a body is represented above the line 52. It is a top view. The atomizers 7, 8, 9 are represented in front of the view 58, in the form of circular disks 59, 60, 61, which indicate the size of the atomizing cone acting on the body. The circular disks 59, 60, 61 are respectively associated with an input and display field 62, 63, 64, with which the atomizer is respectively selected.

In connection with the view 58, the parametrized values are illustrated graphically for the three atomizers 7, 8, 9, as a function of the zone and at the height of the circular disks 59, 60, 61. The values are represented by rectangles. For the atomizer 8, which is indicated by Z32, the paint quantity is represented as a function of the zones. A paint quantity 246, which is indicated by a rectangle 65, is provided for the zone that begins with the coordinate value 65. The paint quantities of the further zone are displayed by means of rectangles 66, 67, 68, 69, 70. The paint quantity is represented in the Y-coordinate direction. The further rectangles above and beneath the rectangles 66 through 70 are associated with the atomizers 7 and 9 for the individual zones. The coordinate axes in the X and Y directions are again illustrated in connection with the circular disks 59, 60, 61. The rectangles 66, 67, 68, 69, 70 indicate the paint quantities in the Y direction, with the values being respectively related to the X-coordinate axes extending through the centers of the circular disks 59, 60, 61. For reasons of symmetry, the values extend on both sides of the X-coordinate axes, and can overlap at the individual atomizers. To distinguish between the overlapping surfaces, these are provided with cross-hatching extending in different directions. The parameters called up for editing via the input field are represented on the field in a predetermined color. This color is, for example, green. The adjustment value 246 is thus represented with a green background. Furthermore, the rectangles 66 through 70 are shown in green. Those values that can be chosen for parametrization via the input field are represented in a different color, e.g. blue.

Therefore, the rows 49, 50, 53, 55, 56 and 57 are represented in blue on the monitor. The rows 51 and 54 cannot be parametrized in the field shown in FIG. 5, because they must be parametrized at the beginning in a different field. Thus, the rows 51 and 54 are represented in a further color, e.g. yellow. Like the above-described fields, the field shown in FIG. 5 has rows for a station status, a global events report and a system status, which are respectively represented in green, red and yellow.

Figure 6:
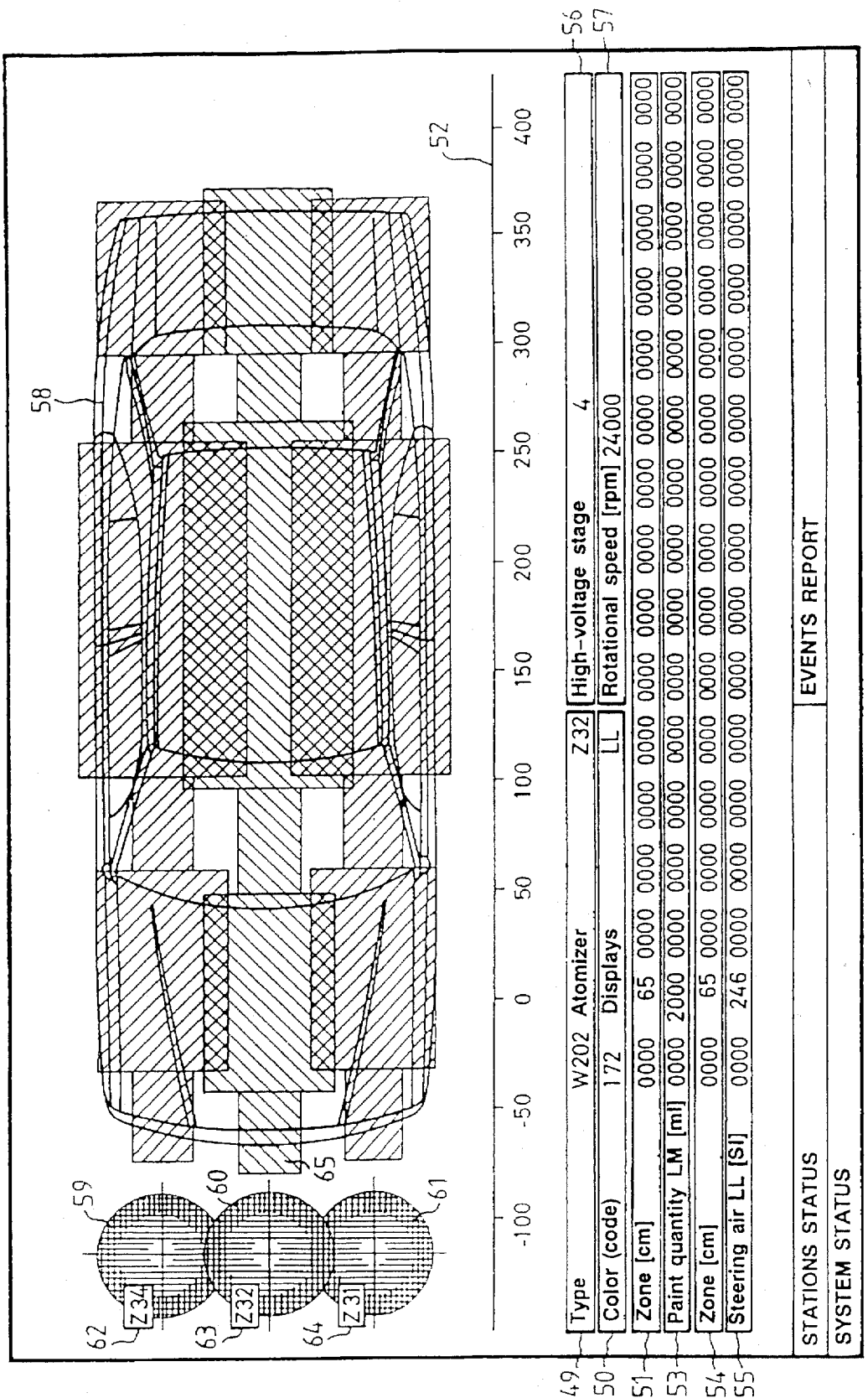
FIG. 6 shows a further window for parametrization and display of another technological adjustment value of the first series of coating tools, which window can be represented on a monitor.

FIG. 6 shows a field whose rows and graphic representation coincide to a great extent with those of the field according to FIG. 5. Coinciding elements were provided with the same reference numerals in FIGS. 5 and 6. However, in the field according to FIG. 6, the paint quantity was not parametrized, but the steering air for the atomizer 8, in which case the type, paint quantity, color, high voltage setting and rotational speed coincide with those values parametrized according to FIG. 5. In row 50, therefore, the abbreviation "LL" is displayed for the control air. Because the steering air is already parametrized for the zone beginning with the value 65, the corresponding adjustment value 246 has a green background. The rectangles represented in connection with the view 58, which are different for the individual zones, indicate in analog fashion the value of the steering air for the three atomizers 7, 8, 9 in the ordinate direction. The rectangles are cross-hatched in different directions, so an unequivocal distinction is possible, even with locations of overlap.

FIG. 7a shows a field with which two adjustment values, namely the paint quantity as well as the steering air, can be parametrized for a selected atomizer, e.g. the atomizer indicated by Z32.

The field according to FIG. 7a is not distinguished from the fields according to FIGS. 5 and 6 in the rows. The graphic representation of the view 5 of the body is also identical. Identical elements are therefore provided with the same reference numerals in FIGS. 5, 6 and 7.

Figure 7B:
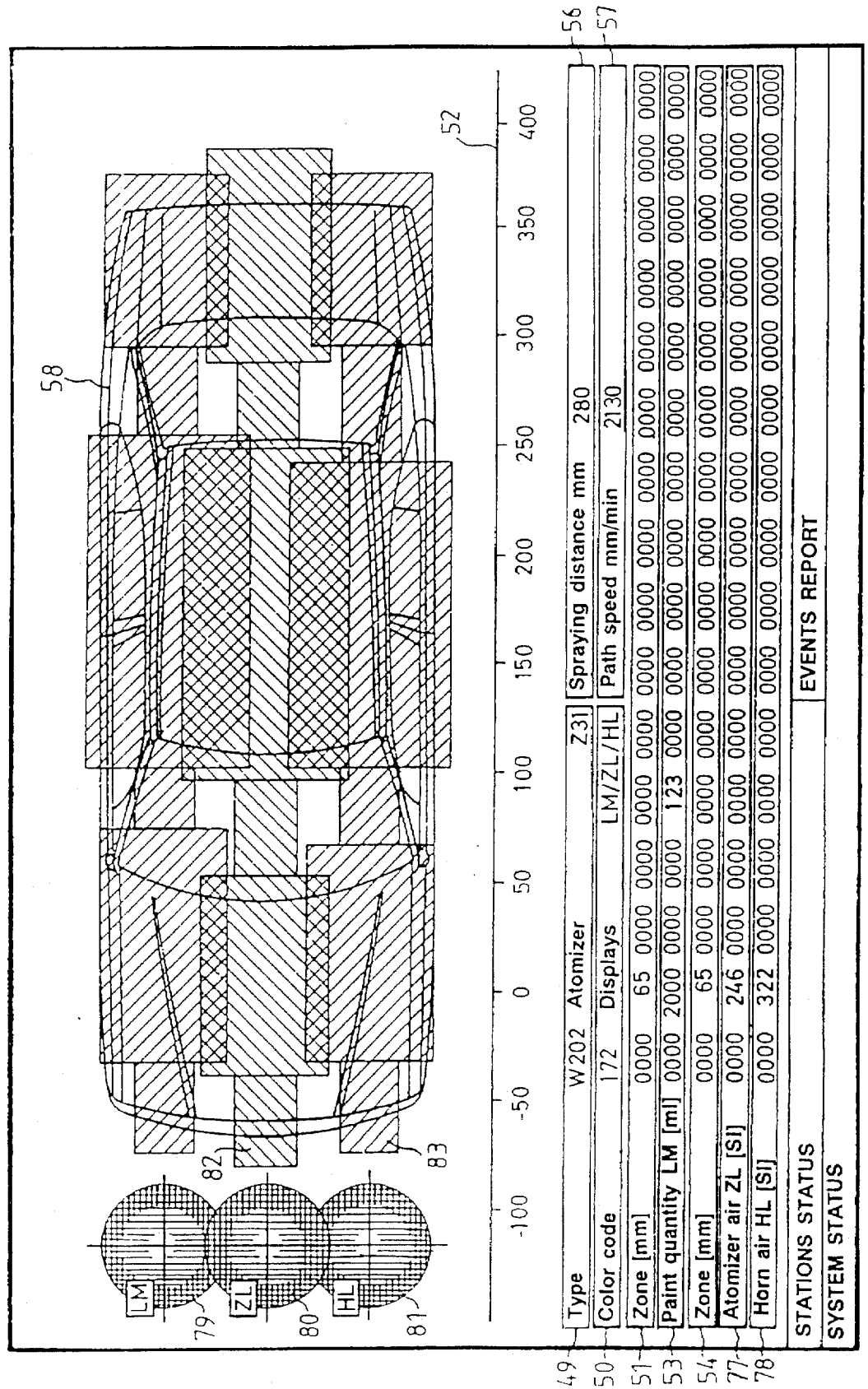
FIG. 7b shows another window for parametrization of three technological adjustment values for a spraying tool, which window can be represented on a monitor.

Because both the paint quantity and the steering air can be parametrized, the abbreviations "LM/LL" appear in row 50, along with the color. Three circular disks are not represented next to the view 58, but rather only two circular disks 71, 72 with display fields 73, 74 for the paint quantity and the steering air. In addition, the display field 63 for the atomizer Z32 or 9 is also displayed between the circular disks 71, 72. The circular disks 73, 74 have different colors, in which the rectangles also represented graphically in connection with the view 58 are represented, with the rectangles indicating in analog form the values of the paint quantity and the steering air that are associated with the individual zones. Only the rectangles 75 of the paint quantity and 76 of the steering air are shown in FIG. 7, with the values appearing in analog form in the ordinate direction. FIG. 7b shows a field which, like the fields according to FIGS. 5, 6 and 7a, includes the rows 49, 51, 53, 54, 56 and 57. The row 49 is specified for the input and representation of the body type and of a selected atomizer allocated the identification Z31. The row 50 is provided for the input and representation of the respective color code and the type of displays. The atomizer air and horn air are represented in addition to the paint quantity, which is abbreviated with "LM," and can be entered as parameters. Two rows 77, 78 are provided for the input and representation of the atomizer air indicated by "ZL" and the horn air indicated by "HL." The rows 56 and 57 respectively display the spraying distance and the path speed.

Three circular disks 79, 80, 81, which respectively indicate the colors and the level of the graphic displays of the air quantity, atomizer air and horn air, are provided in addition to the view 58 of the body. The abbreviated identifications of the respective adjustment values are given in the circular disks.

Rectangles for the successive zones and which indicate the lengths of the zones in the abscissa direction and the adjustment values of the paint quantity, atomizer air and horn air in the ordinate direction are represented in connection with the view 58, along with the circular disks 79, 80, 81. In the ordinate direction, the rectangles 82, 83 indicate the values of the atomizer air and horn air for the atomizer 8 for the first zone, which values are numerically displayed in the rows 77, 78.

Figure 8:
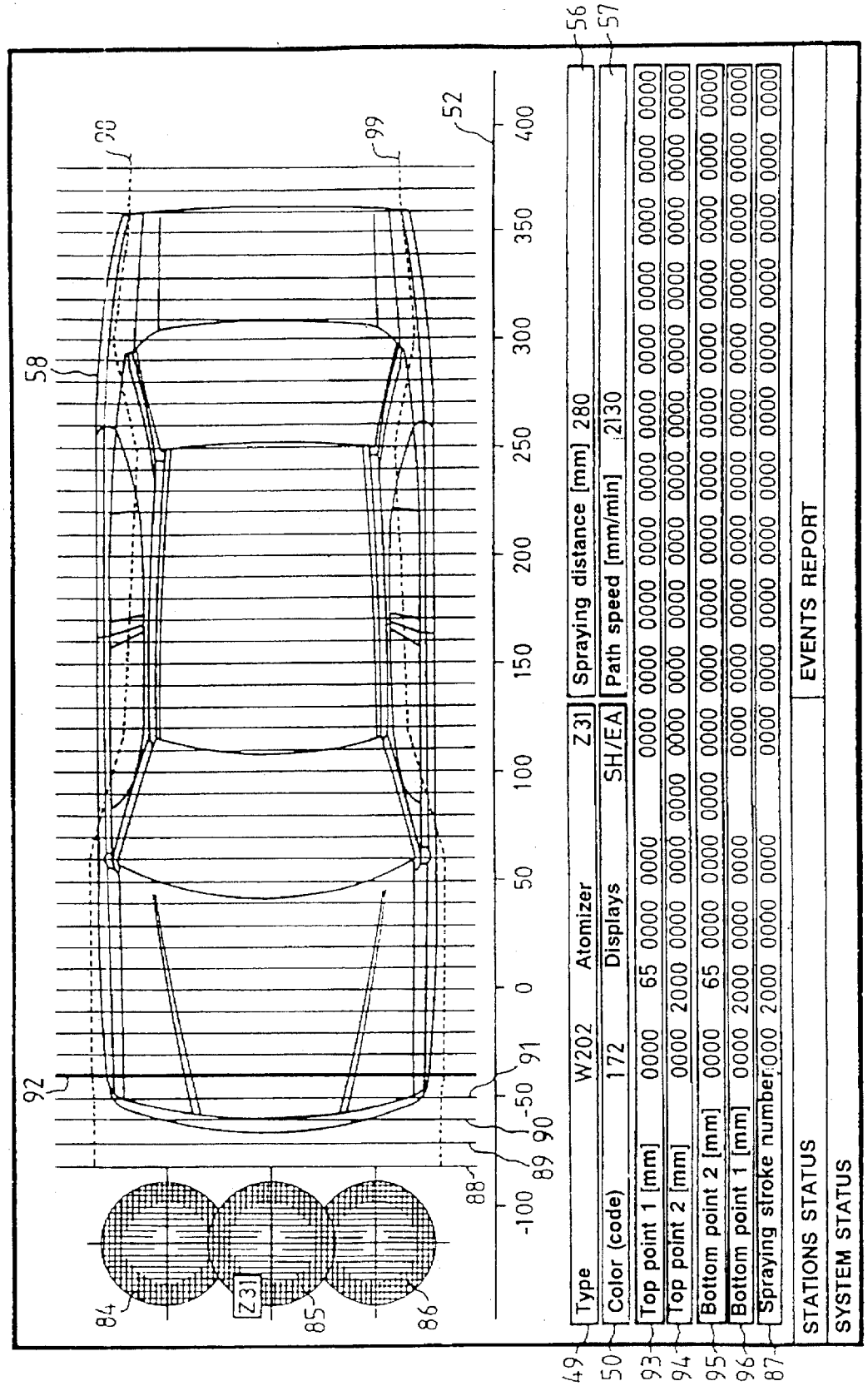
FIG. 8 shows a window for parametrization and display of technical adjustment values of the spraying or atomizing apparatus in connection with spraying strokes for the first series of coating apparatuses, which window can be represented on a monitor.

FIG. 8 illustrates a window that permits parametrization of the number of spraying strokes per zone, and of the switch-on points and switch-off points of the spraying strokes. As in the above-described fields, a line with true-to-scale information about length is present in the X-coordinate direction. Furthermore, the view 58 of the body is displayed true-to-scale with respect to the scale of the line 52. The atomizers 7, 8, 9 are represented symbolically by circular disks 84, 85, 86 next to the body. As in the fields already described above, the rows 49, 50 and 56, 57 are present. The type and the selected atomizer are entered and displayed with the row 49. The row 50 is specified for the display and input of the color and the type of displays. The spraying strokes, which are abbreviated "SH," and the switch-on points and switch-off points, which are abbreviated with "EA," are parametrized as a function of the zone with the field according to FIG. 8. The number of spraying strokes is entered and represented with a row 87. In connection with the view 58, the number of spraying strokes is represented by lines, e.g. 88, 89, 90, 91, 92 for the first zone. The rows 93, 94, 95, 96 are specified for the numerical input and display of the switch-on, switch-off points. Upper switch-on, switch-off points of the atomizers can be determined with the rows 93, 94, and lower switch-on, switch-off points of the atomizers can be determined with the rows 95, 96. Curves 98, 99 indicate the spraying strokes of the switch-on, switch-off points.

Figure 9:
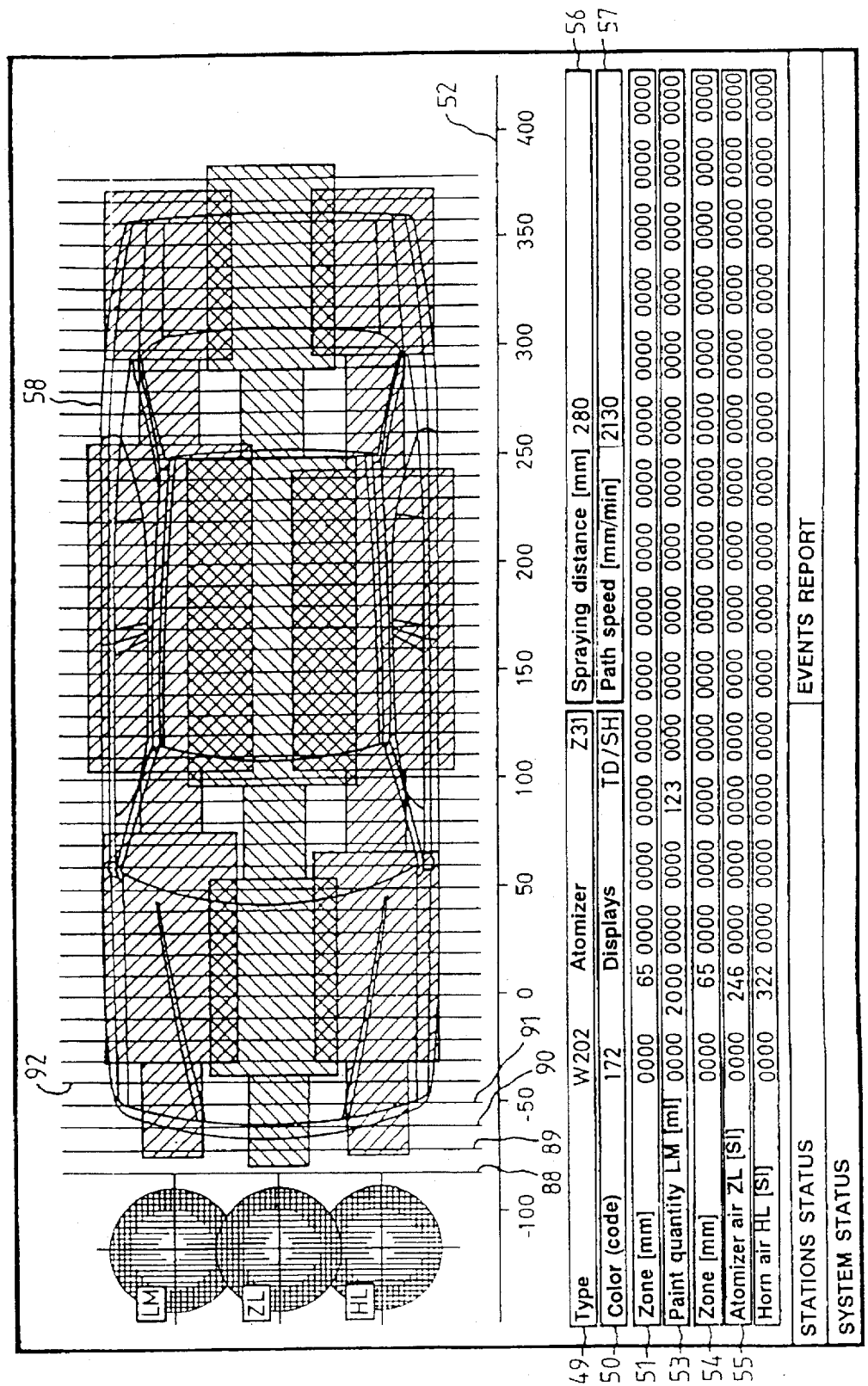
FIG. 9 shows a window for parametrization and display of the spraying strokes of the first series of coating tools, which window can be represented on a monitor.

FIG. 9 shows a field with which technological data, namely paint quantity, atomizer air and horn air, can be parametrized, and the number of spraying strokes per zone is displayed at the same time. The field coincides with the field shown in FIG. 7b up to the represented spraying strokes. Identical elements were provided with the same reference numerals in FIGS. 7b and 9.

As in the field illustrated in FIG. 8, the spraying strokes are represented as lines in connection with the view 58 of the body. For the first zone, lines are indicated by 88, 89, 90, 91 and 92 in FIG. 9. In row 50, "TD," an identification for technological data, and "SH" are represented as displays.

Figure 10:
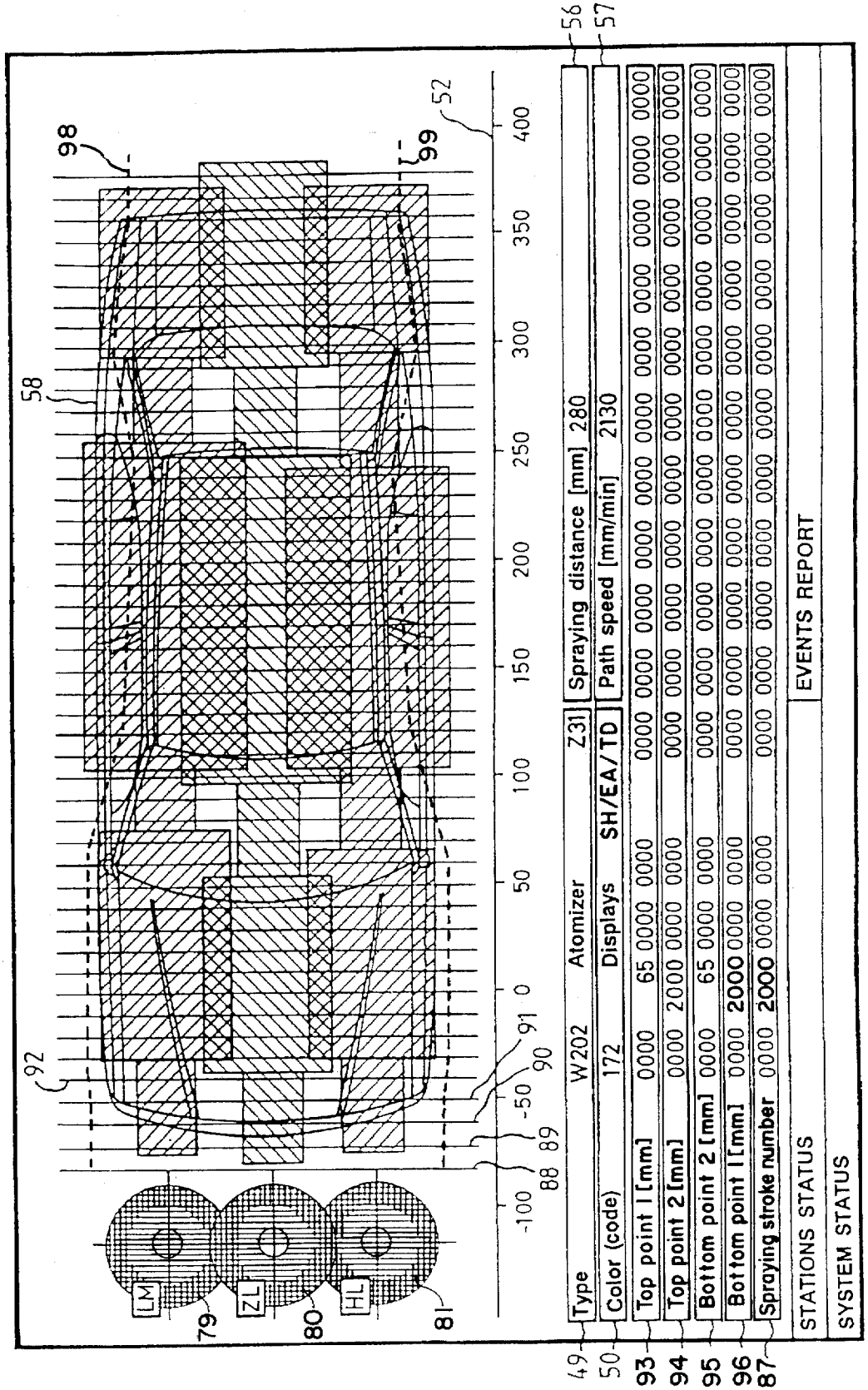
FIG. 10 shows a window for the display and parametrization of reversal points of the spraying strokes, which window can be represented on a monitor.

FIG. 10 shows a field that displays technological data in addition to the adjustment values illustrated in FIG. 8. The rows for entry and display are identical to those according FIG. 8, and are therefore provided with the same reference numerals. In addition to the data according to FIG. 8, technological data for the atomizer Z31 displayed in row 49 are graphically represented in FIG. 10 as a function of the zone. This is taken into consideration by the addition of "TD" in row 50. The technological data relate to the paint quantity, atomizer air and horn air, which is indicated by the same circular disks 79, 80, 81 as in FIG. 7b, with the designations LM, ZL and HL.

Figure 11:
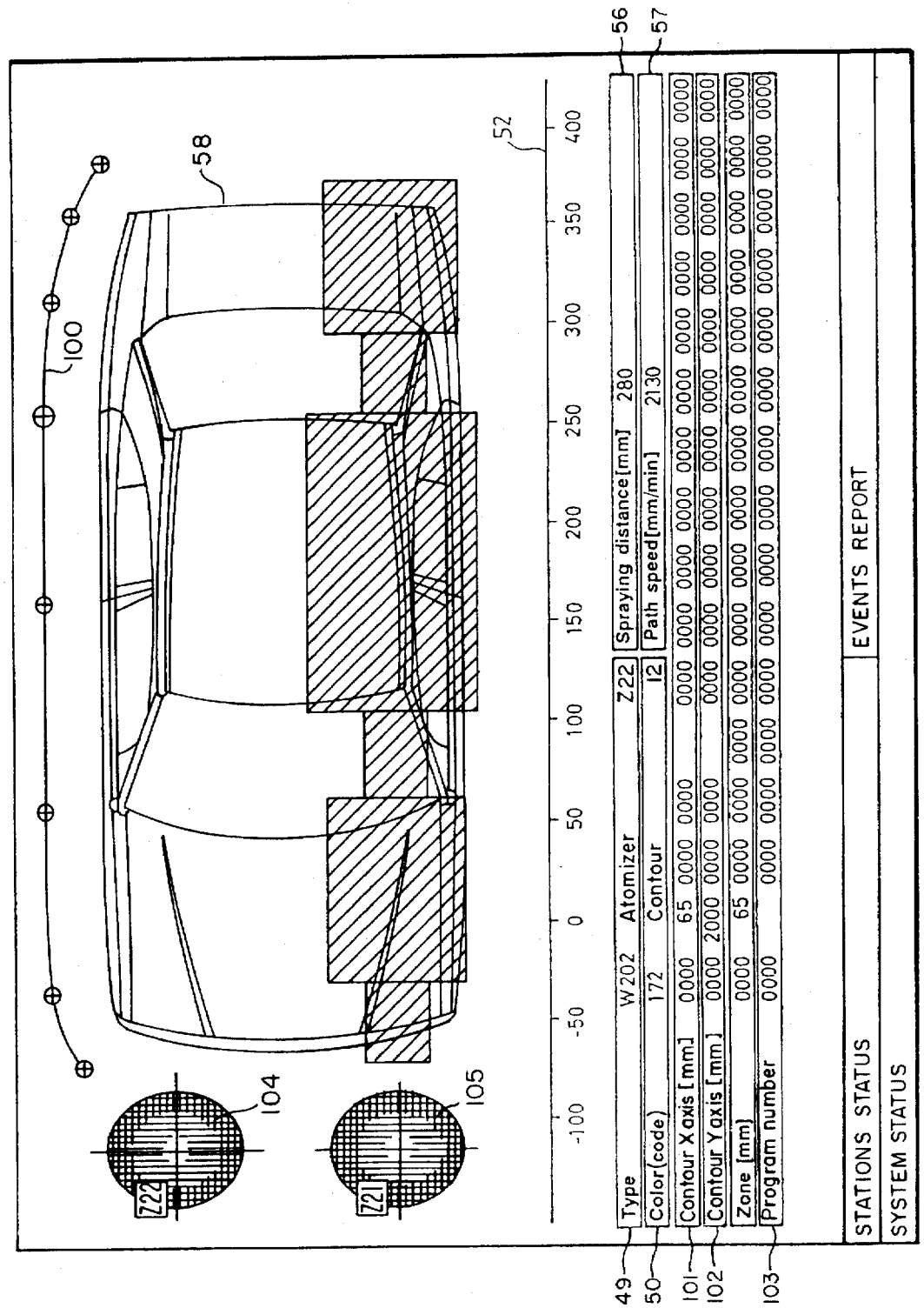
FIG. 11 shows a window for parametrization of the contour and zone-independent program identifications for the atomizer path to be traversed by a second series of coating tools.

In connection with a view 58 of the body from above, FIG. 11 shows the contour 100 described by the atomizer 10 along the body, which contour is determined in the direction of the X and Y axes. The rows 49, 50 and 56, 57 are provided as fields for input and display of numerical adjustment values. A certain contour number which is graphically represented and indicated by 100 is given in row 50. The individual points of the contours at the ends of the zones are determined with values in the X- and Y-coordinate directions. Rows 101, 102 are provided for this purpose. A further row is specified for the input and display of the zones. A selected program number for each zone is given in the additional rows 102.

Next to the view 58, the atomizers 10, 11 are symbolically represented, with their identifications Z12, Z21, by two circular disks 104, 105.

Automated painting machines can be parametrized, particularly for automobile bodies, in accordance with the above-described method. In parametrization, the adjustment values that are significant for consistent painting quality are displayed for the operator in a well-laid-out form. The painting process is influenced by the geometry of the spray nozzle path and the body, the painting speed, the paint flow-through quantity per time unit, the atomizing air and horn air, the electrical field intensity, the viscosity and the solids component of the paint. The display operating according to the above-described method permits simultaneous recognition of many of these parameters, so that when the values of a parameter are changed, the influence of this which is exerted on other parameters is immediately apparent. Hence, not only can favorable parameter adjustment be achieved; the parameter adjustment online is shortened temporally. The method can be employed in pneumatic painting and electrostatic painting. Pneumatic painting includes the method based on compressed-air systems, airless spraying systems and air-mix systems. In compressed-air spraying, high-pressure spraying is primarily used. Paint material is located in a pressure chamber in which an overpressure is caused with the aid of compressed air; by means of this overpressure, the paint material is transported to high-pressure spray guns that have spray nozzles. Paint material and air are supplied to the spray nozzles. The paint material exiting the nozzles is surrounded in annular fashion by rapidly-flowing air. The paint particles exiting the spray nozzle form an atomizing cone. In addition, the horn air can be turned on, in which airstreams that serve to control the shape of the atomizing cone and support the atomizing process are guided in through lateral air nozzle apertures. When the horn air is turned on, the atomizer cone is deformed. Knowledge about the connections between spraying stream shape, concentration distribution of the paint per time unit in the atomizing cone, and about process parameters and paint parameters is primarily obtained empirically. The above-described method facilitates obtaining this knowledge in online parametrization, with simultaneous checking of the effect of the adjustments on the painted objects.

The atomizers 7 through 11 respectively travel along predetermined paths of movement with appropriately adjusted process parameters. The orientation of the spray nozzles and the speed of the spray nozzles essentially determine the structure of the paint layer. The paint particles spread on the painted surface. For painting, the individual atomizing cones overlap. A uniform paint layer thickness is particularly dependent on the spray nozzle speed and the paint flow-through quantity per time unit.

Airless spraying operates with a spray nozzle to which the paint material is supplied under very high pressure. The spray nozzle has a very narrow diameter.

In electrostatic painting, an electrostatic field having a high direct voltage is built up between the work piece to be painted and the electrically-insulated spraying element. The paint material is atomized by pistol-, shell-, bell- or disk-shaped atomizing tools. An atomizing cone is formed in the process. Electrostatic painting can be effected purely electrostatically or with auxiliary energy. Compressed air or centrifugal forces can be used as auxiliary energies. The atomizers, in the form of rotating bells, assure uniform distribution of the paint at high speeds. In high-speed rotation systems, the electrical field intensity has only a slight influence on the atomizing process. Steering air is needed in these systems to regulate the spraying stream width. The process parameters, such as rotational speed, paint flow-through quantity per time unit and atomizing distance, are adapted to the body contour by the above-described method.

Electrostatic compressed-air spraying is also known, as is electrostatic powder coating. In the latter method, a spray booth, a powder-spraying apparatus, a separation system, a powder preparation and a powder-metering device are used. The above-described parametrization method can be used for the disclosed coating method.

What is claimed is:

1. Method of entering and displaying adjustment parameters of an apparatus for coating objects that are moved into coating positions by a transport apparatus, with at least one spraying or atomizing tool being disposed in a coating station so as to be stationary or to move relative to the objects, and having control elements which are controlled according to the adjustment parameters, and wherein on a monitor of a personal computer which either stores parametrization data generated by an input apparatus for the coating apparatus offline or further conducts the parametrization data online to a program control connected to the coating apparatus, the monitor having at least one window, a graphic view of an object and, next to the view of the object and on an correct scale, a coating surface of the at least one spraying tool present on a surface of the object are represented, that coating zones following one after the other in a transport direction of the object are represented schematically by rectangles along a line extending through the center of the represented spraying tool in the view of the object, the length of the rectangles being a measure for a length of respective coating zones, and the height of the rectangles being a measure for an adjustment value of the respective at least one spraying tool, that rows of an input field containing numerical information about the type of the displayed object and an identification of the spraying tool that can be called up via the input apparatus for parametrization are displayed below the view of the object, and at least the coating zone lengths are displayed with a further adjustment value that can be parametrized, and that the off- or online operating mode of the program control and a summarizing message about interference are displayed.

2. Method according to claim 1, wherein the adjustment values of respective spraying tools or control elements called up for editing are displayed in a predetermined color on the monitor.

3. Method according to claim 1, wherein the adjustment values of spraying tools or control elements not called up for editing are displayed in a different, predetermined color.

4. Method according to claim 1, wherein adjustment values of components that cannot be edited via the window and are displayed in a different, predetermined color are displayed with the window.

5. Method according to claim 1, wherein a view of the object is represented on the monitor within a first rectangle indicating the length and width of the processing, which can be parametrized, the rectangle lying inside a rectangle displaying a necessary working region of the spraying tool, with a second rectangle associated with the work region and at a transport-speed-dependent distance from the first rectangle also being represented, via rows of an input field, in which the type of object, a conveying speed, a projection over the object that is necessary for processing, a position of a start cam that initiates a coating process, and the length and width of the respective object are represented.

6. Method according to claim 1, wherein in addition to the spraying tool, a view with the contour of the respective object and a selected partial surface for a spraying tool are represented graphically on the monitor having a window, with the type of object, the number of partial surfaces, the selected spraying tool, and the envelope curve coordinates being represented alphanumerically in rows.

7. Method according to claim 1, wherein fields are provided which have rows for the parametrization of paint quantity for each zone, of the spraying tool and of steering air.

8. Method according to claim 1, wherein an additional window is provided for the entry and display of spraying strokes alphanumerically and in the form of parallel dashes represented on the graphic view of the object, in connection with technological data indicated by rectangles as a function of the zones, which data can be selected for a spraying tool, and that a further input field is provided, with which reversal points of the spraying strokes can be predetermined numerically.

9. Method according to claim 1, wherein a window is provided on which a top view of the object and, at a distance therefrom, a contour in connection with the respective spraying tool are represented, with the type of object, color, a contour identification, the zones and axis spacing of the, spraying tool from a reference line and an identification for a program being given in rows in an input field, the program relating to a path in the respective zone to be traversed by the spraying tool.

10. Method according to claim 1, wherein the objects are vehicle parts.

11. Method according to claim 10, wherein the vehicle are vehicle bodies.

* * * * *